US012623609B2

(12) United States Patent
Tian

(10) Patent No.: US 12,623,609 B2
(45) Date of Patent: May 12, 2026

(54) VEHICLE RECOVERY TRACK ON-BOARD MOUNTING HOLDER

(71) Applicant: NINGBO TOGETHER TRADING CO., LTD., Ningbo (CN)

(72) Inventor: Huike Tian, Ningbo (CN)

(73) Assignee: NINGBO TOGETHER TRADING CO., LTD., Ningbo (CN)

( * ) Notice: Subject to any disclaimer, the term of this patent is extended or adjusted under 35 U.S.C. 154(b) by 381 days.

(21) Appl. No.: 18/509,286

(22) Filed: Nov. 14, 2023

(65) Prior Publication Data

US 2025/0153651 A1     May 15, 2025

(51) Int. Cl.
    *B60R 9/048*        (2006.01)
(52) U.S. Cl.
    CPC ................................... *B60R 9/048* (2013.01)
(58) Field of Classification Search
    CPC .. B60R 9/048; F16B 2/065; F16B 5/02; F16B 5/0621; F16B 5/0642; F16B 2/06; F16B 2/12; B25B 5/10; B25B 5/109; B25B 5/145; B25B 27/062; B25B 27/023; B25B 27/06; B25B 1/00; B25B 1/02; B25B 1/10; B25B 1/103; B25B 1/14; B25B 1/2421; B25B 1/2468
    USPC ................ 224/309, 448, 456, 461, 515, 536
    See application file for complete search history.

(56) References Cited

U.S. PATENT DOCUMENTS

| | | | | |
|---|---|---|---|---|
| 5,066,446 A | * | 11/1991 | Phillips, II | F16B 19/1072 264/254 |
| 6,345,426 B1 | * | 2/2002 | Collier | B25B 5/147 29/282 |
| 7,980,437 B2 | * | 7/2011 | Binder | B60R 9/04 224/330 |
| 8,814,014 B2 | * | 8/2014 | Bocker | B60R 9/00 224/326 |
| 2015/0073351 A1 | * | 3/2015 | Kim | A61M 5/20 604/189 |
| 2024/0116455 A1 | * | 4/2024 | Smith | B60R 11/00 |

* cited by examiner

*Primary Examiner* — Justin M Larson
*Assistant Examiner* — Lester L Vanterpool

(57)            ABSTRACT

The present disclosure provides a vehicle recovery track on-board mounting holder, including a pressing plate. Mounting holes are formed in two ends of the pressing plate. Both mounting holes are provided with a fixing device. The fixing device includes a bolt stud, a sleeve, an upper gasket, a lower gasket and a locking nut. The bolt stud is connected with the locking nut. A top of the bolt stud is fixed with a handle. A lower end of the handle is provided with a liming surface. The vehicle recovery track on-board mounting holder of the present disclosure is compact in structure, small in volume, and portable. The on-board mounting holder is convenient in operation, realizing rapid fixation of the recovery track, and the fixation is strong, ensuring safety and reliability. A plurality of recovery tracks can be fixed through replacement or removal of the sleeve, achieving convenience and fastness.

8 Claims, 5 Drawing Sheets

8

801

VEHICLE RECOVERY TRACK ON-BOARD MOUNTING HOLDER

TECHNICAL FIELD

The present disclosure relates to a vehicle recovery track, and in particular to a vehicle recovery track on-board mounting holder.

BACKGROUND ART

For vehicles driving on sand, snow or mud, the active tires can easily sink into the ground, making it impossible for the vehicles to move forward. The general method to get a trapped vehicle out of trouble is to place stones, wooden boards or other hard objects under the trapped tire to increase friction and support, and then start the vehicle to free the trapped tire. This method is the most primitive and simple, and it depends on the surrounding environment. If there are no usable objects in the surrounding environment, such as stones, wooden boards and other hard objects, the vehicle will not be able to get out of trouble.

At present, many off-road vehicles like to drive on mud, sand or terrible roads in pursuit of excitement. Because of this, the vehicles are often trapped in mud, sand or potholes. Therefore, among the equipment of off-road vehicles, there is additional equipment that ordinary vehicles do not have, that is, a recovery track.

When a traditional recovery track is not in use, it is placed in a vehicle, taking up space; or it is fixed on the roof of the vehicle through ropes, and the fixation is inconvenient to fix and poses safety risks during driving.

SUMMARY OF THE DISCLOSURE

[1] Technical Problem to be Solved

The technical problem to be solved by the present disclosure is to provide a vehicle recovery track on-board mounting holder for mounting a recovery track on the roof of a vehicle under convenient and strong fixation.

[2] Technical Solution for the Problem

The present disclosure provides a vehicle recovery track on-board mounting holder, including a pressing plate 4. Mounting holes 401 are formed in two ends of the pressing plate 4. Both mounting holes 401 are provided with a fixing device. The fixing device includes a bolt stud 5, a sleeve 2, an upper gasket 3, a lower gasket 6 and a locking nut 7. The bolt stud 5 is connected with the locking nut 7 after running through the sleeve 2, the upper gasket 3, the mounting hole 401 and the lower gasket 6 successively from top to bottom. A mounting portion is formed between a lower end surface of the pressing plate 4 and an upper end surface of the lower gasket 6 for a vehicle recovery track and a vehicle holder to be sleeved in. A top of the bolt stud 5 is fixed with a handle 1. A lower end of the handle 1 is provided with a liming surface in contact with an upper end surface of the sleeve 2.

Further, the mounting hole 401 is in a strip shape and a length direction of the mounting hole is parallel with a length direction of the pressing plate 4.

Further, the lower end of the handle 1 is provided with a boss 11, a concave hole is formed in a lower end of the boss, and the concave hole is embedded with a metal nut 11 inside for connection with the bolt stud.

Further, the locking nut is a flange nut.

Further, a sidewall of the handle 1 is provided with anti-slip bars.

Further, the handle 1 is in a round shape, and a sidewall of the handle 1 is uniformly and circumferentially distributed with protrusions.

Further, a difference between an outer diameter of the sleeve 2 and an outer diameter of the bolt stud 5 is equal to or greater than 3 mm.

Further, the pressing plate 4 and/or the sleeve 2 are made of plastic.

[3] Beneficial Effects

The vehicle recovery track on-board mounting holder of the present disclosure is compact in structure, small in volume, and portable. The on-board mounting holder is convenient in operation, realizing rapid fixation of the recovery track, and the fixation is strong, ensuring safety and reliability. A plurality of recovery tracks can be fixed through replacement or removal of the sleeve, achieving convenience and fastness.

Figure 1:
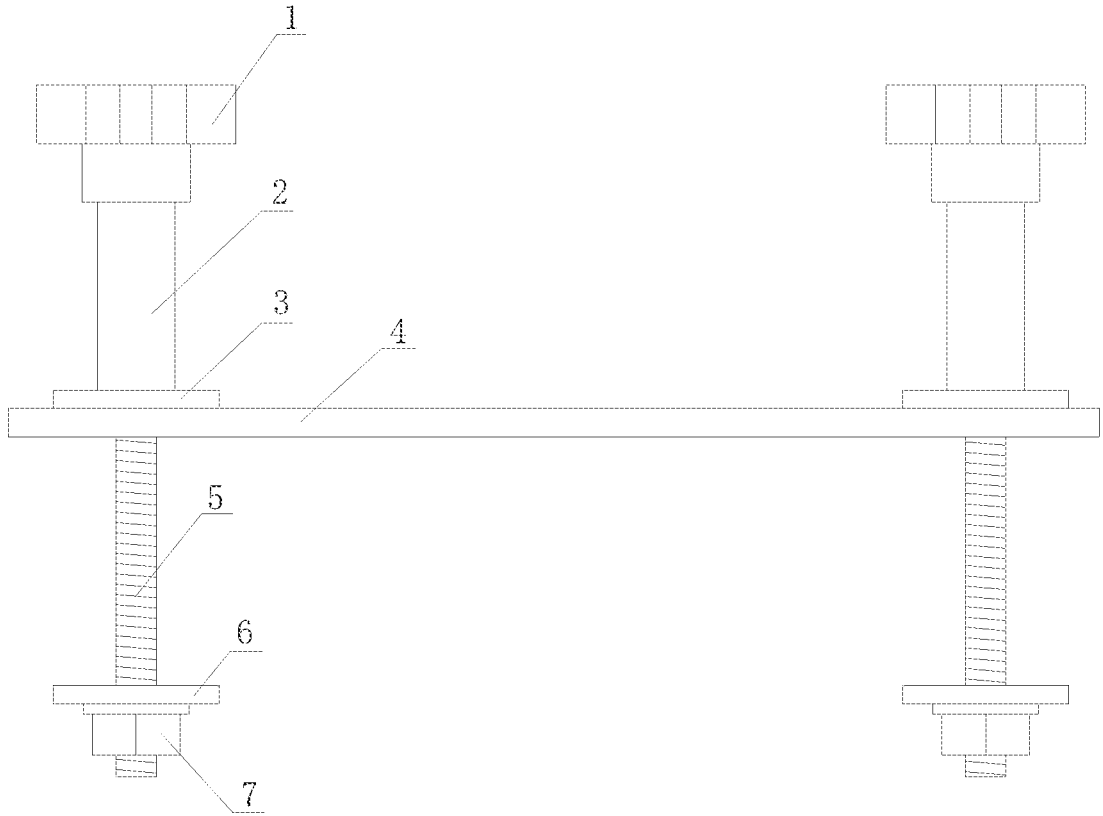
FIG. 1 is a schematic structure diagram of a vehicle recovery track on-board mounting holder of the present disclosure.
Figure 2:
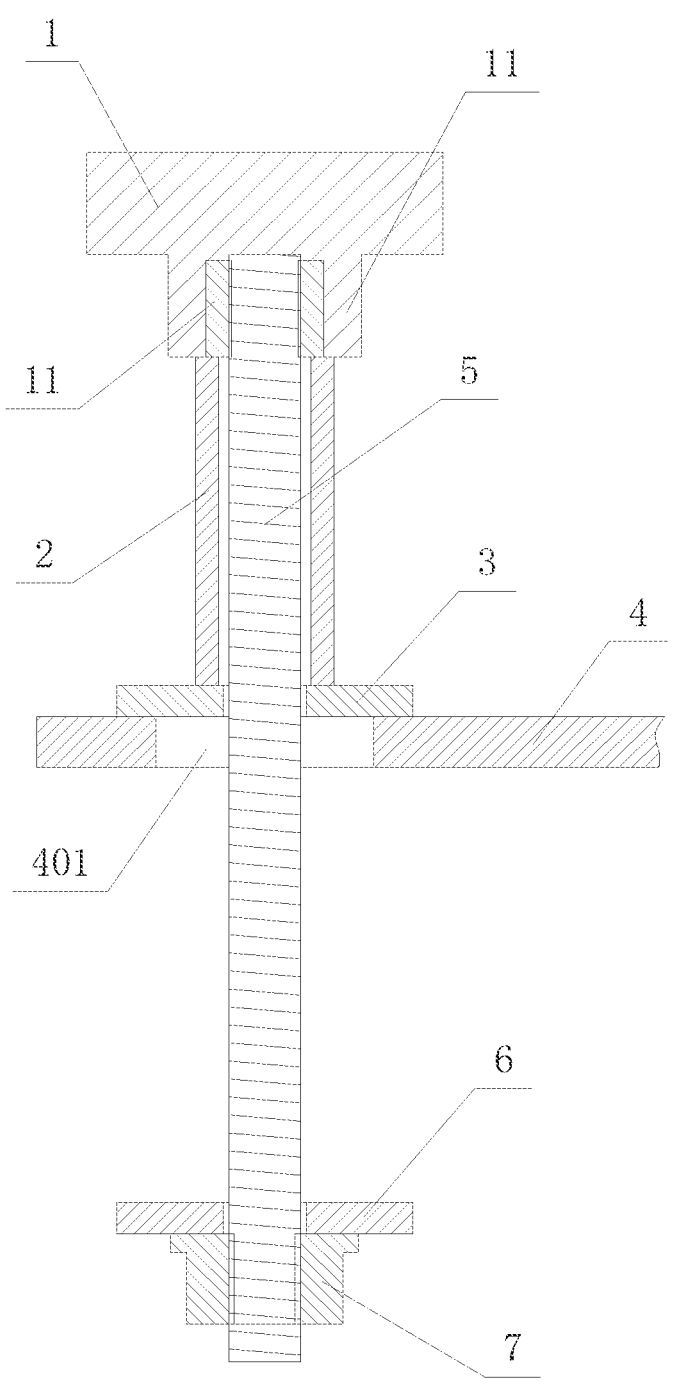
FIG. 2 is a schematic structure diagram of a fixing device of a vehicle recovery track on-board mounting holder of the present disclosure.
Figure 3:
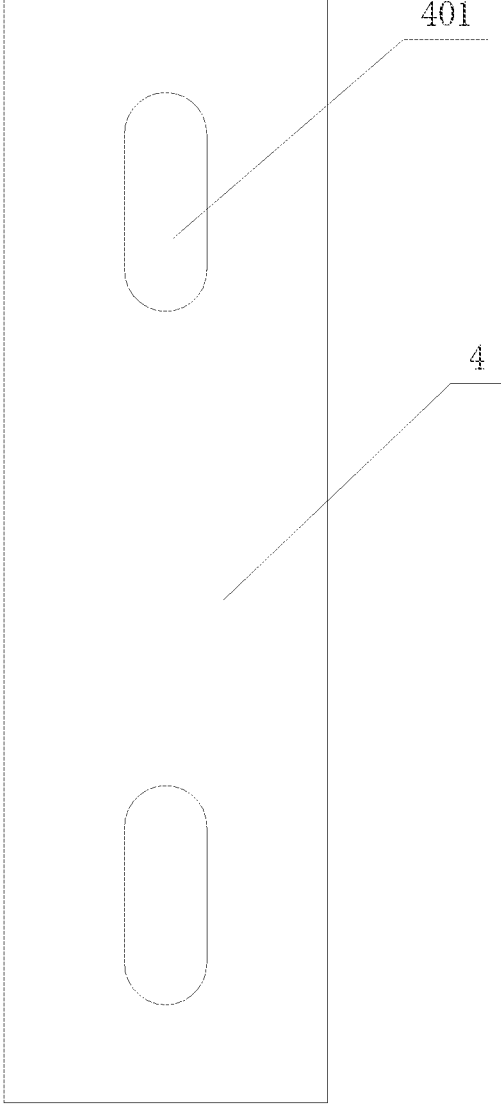
FIG. 3 is a schematic structure diagram of a pressing plate of a vehicle recovery track on-board mounting holder of the present disclosure.
Figure 4:
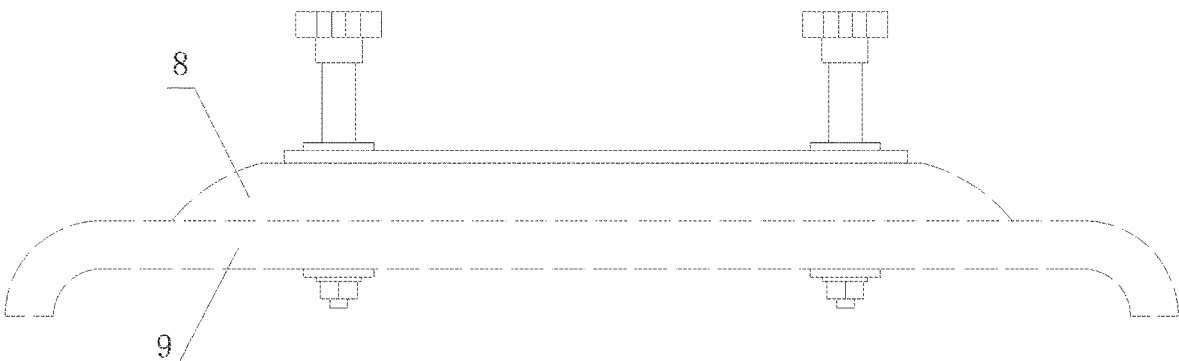
FIG. 4 is a use state diagram of a vehicle recovery track on-board mounting holder of the present disclosure.

In the drawings: 1—handle, 11—boss, 2—sleeve, 3—upper gasket, 4—pressing plate, 401—mounting hole, 5—bolt stud, 6—lower gasket, 7—locking nut, 8—vehicle recovery track, 801—hole and 9—vehicle holder.

DETAILED DESCRIPTION OF THE DISCLOSURE

The embodiment of the present disclosure will be introduced in detail below with reference to the accompanying drawings.

Figure 5:
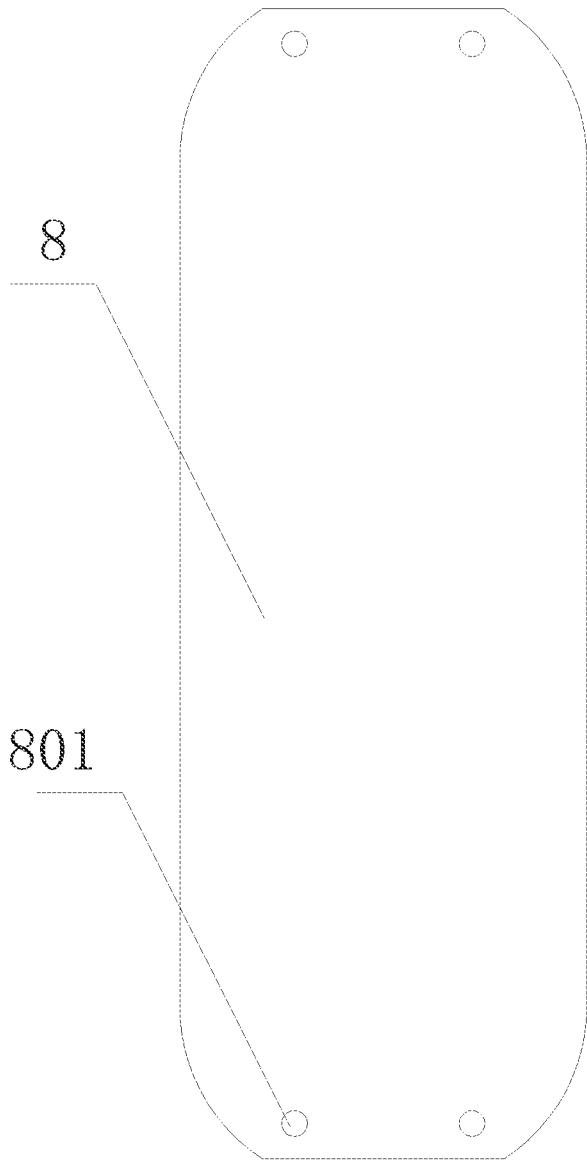
FIG. 5 is a schematic structure diagram of a vehicle recovery track.

Referring to FIG. 1 to FIG. 4, the present disclosure provides a vehicle recovery track on-board mounting holder, for fixing a vehicle recovery track on a vehicle holder 9 on the roof of a vehicle. The structure of the vehicle recovery track 8 is as shown in FIG. 5. Two holes 801 are formed in two ends of the vehicle recovery track for fixation respectively. A connection line between the two holes is parallel to a width direction of the vehicle recovery track. The on-board mounting holder of the present disclosure includes a pressing plate 4. Mounting holes 401 are formed in two ends of the pressing plate 4. In the embodiment, the mounting hole 401 is in a strip shape and a length direction of the mounting hole is parallel with a length direction of the pressing plate 4, and can fix recovery tracks with different sizes and specifications. Both mounting holes 401 are provided with a fixing device. The fixing device includes a bolt stud 5, a sleeve 2, an upper gasket 3, a lower gasket 6 and a locking nut 7. The bolt stud is a rod as a whole, with external threads on its outer wall. The bolt stud 5 is connected with the locking nut 7 after running through the sleeve 2, the upper gasket 3, the mounting hole 401 and the lower gasket 6 successively from top to bottom. A mounting portion is formed between a lower end surface of the pressing plate 4 and an upper end surface of the lower gasket 6 for the vehicle recovery track and the vehicle holder to be sleeved in. During mounting and fixation, the bolt stud is connected with the locking nut 7 after running through the sleeve 2, the upper gasket 3, the mounting hole 401, the vehicle recovery track 8, the vehicle holder 9 and the lower gasket 6 successively from top to bottom, realizing compression and fixation of the recovery track. To improve the fixation reliability, and avoid loosening, the locking nut in the embodiment is a flange nut, with an anti-loosening function. A top of the bolt stud 5 is fixed with a handle 1. A lower end of the handle 1 is provided with a liming surface in contact with an upper end surface of the sleeve 2, for compressing the sleeve 2, to prevent the recovery track from shaking. For convenient operation, the handle is polygonal or round. A sidewall of the handle 1 is uniformly and circumferentially distributed with protrusions, forming anti-slip bars for convenient operation. To reduce the production cost and facilitate removal, in the embodiment, the lower end of the handle 1 is provided with a boss 11. A lower end surface of the boss forms a limiting surface, a concave hole is formed in a center of the lower end surface of the boss, and the concave hole is embedded with a metal nut 11 inside for connection with the bolt stud. The structure facilitates removal and carrying, reduces space occupation, and has strong connection. To improve the strength, a difference between an outer diameter (diameter) of the sleeve 2 and an outer diameter (diameter) of the bolt stud 5 in the embodiment is equal to or greater than 3 mm, increasing a contact radius with the pressing plate and the limiting surface, and improving the compressing stability. To reduce the weight and cost, in the embodiment, the pressing plate 4 and the sleeve 2 are made of plastic, and specifically, made of high-strength plastic, such as PA, PPS, IXEF and PEEK, which have the advantages of light weight and high strength.

The vehicle recovery track on-board mounting holder of the present disclosure is compact in structure, small in volume, and portable. The on-board mounting holder is convenient in operation, realizing rapid fixation of the recovery track, and the fixation is strong, ensuring safety and reliability. A plurality of recovery tracks can be fixed through replacement or removal of the sleeve, achieving convenience and fastness.

The above are only preferred embodiments of the present disclosure. It should be pointed out that those of ordinary skill in the art can make several improvements and modifications without departing from the technical principles of the present disclosure. These improvements and modifications should also be regarded as the protection scope of the present disclosure.

What is claimed is:

1. A vehicle recovery track on-board mounting holder, comprising a pressing plate, wherein mounting holes are formed in two ends of the pressing plate; both mounting holes are provided with a fixing device; the fixing device comprises a bolt stud, a sleeve, an upper gasket, a lower gasket and a locking nut; the bolt stud is connected with the locking nut after running through the sleeve, the upper gasket, the mounting hole and the lower gasket successively from top to bottom; a mounting portion is formed between a lower end surface of the pressing plate and an upper end surface of the lower gasket for a vehicle recovery track and a vehicle holder to be sleeved in; a top of the bolt stud is fixed with a handle; and a lower end of the handle is provided with a limiting surface in contact with an upper end surface of the sleeve.

2. The vehicle recovery track on-board mounting holder according to claim 1, wherein the mounting hole is in a strip shape and a length direction of the mounting hole is parallel with a length direction of the pressing plate.

3. The vehicle recovery track on-board mounting holder according to claim 1, wherein the lower end of the handle is provided with a boss, a concave hole is formed in a lower end surface of the boss, and the concave hole is embedded with a metal nut inside for connection with the bolt stud.

4. The vehicle recovery track on-board mounting holder according to claim 1, wherein the locking nut is a flange nut.

5. The vehicle recovery track on-board mounting holder according to claim 1, wherein a sidewall of the handle is provided with anti-slip bars.

6. The vehicle recovery track on-board mounting holder according to claim 1, wherein the handle is in a round shape, and a sidewall of the handle is uniformly and circumferentially distributed with protrusions.

7. The vehicle recovery track on-board mounting holder according to claim 1, wherein a difference between an outer diameter of the sleeve and an outer diameter of the bolt stud is equal to or greater than 3 mm.

8. The vehicle recovery track on-board mounting holder according to claim 1, wherein the pressing plate and/or the sleeve are made of plastic.

\* \* \* \* \*